451-213 SR
M9645 OR RE 001,061
H. R. Burger,
Grinding Saws.
No. 1061 Reissued, Oct. 16, 1860
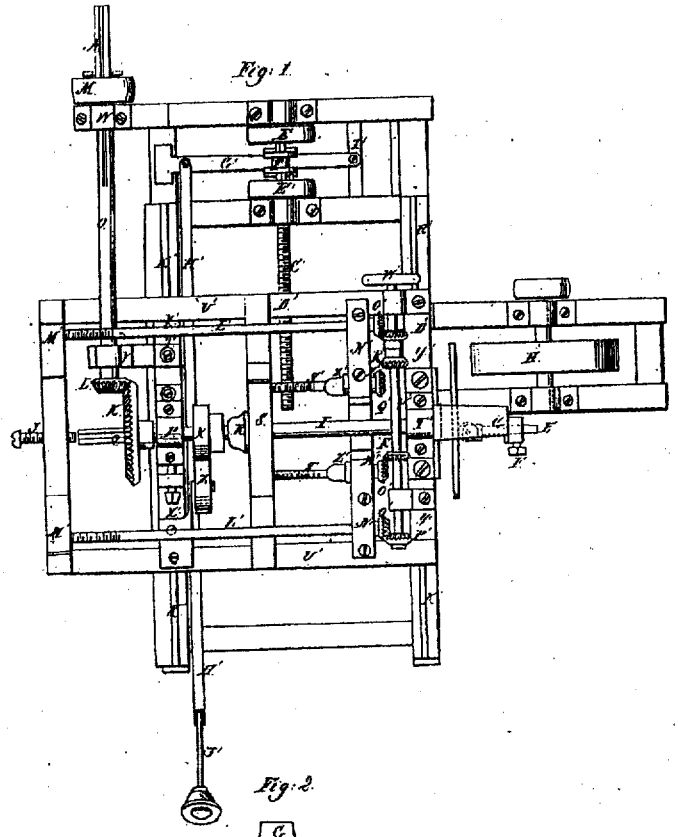
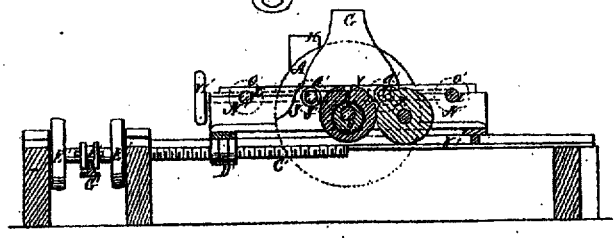
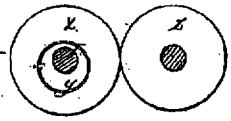
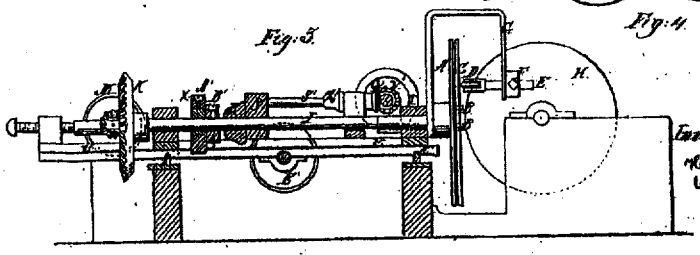
Witnesses:
Inventor,

UNITED STATES PATENT OFFICE.

H. R. BURGER, OF RICHMOND, VIRGINIA.

IMPROVED MACHINE FOR GRINDING SAWS.

Specification forming part of Letters Patent No. 29,950, dated September 11, 1860; Reissue No. 1,061, dated October 16, 1860.

*To all whom it may concern:*

Be it known that I, H. R. BURGER, of Richmond, in the county of Henrico and State of Virginia, have invented a new and useful Improvement in Machines for Grinding Saws; and I do hereby declare that the following is a full, clear, and exact description of the same, reference being had to the accompanying drawings, forming a part of this specification, in which—

Figure 1 represents a plan, Fig. 2 a vertical cross-section, and Fig. 3 a vertical longitudinal section, of the machine. Fig. 4 is a detached portion of it.

Similar letters of reference in each of the several figures indicate corresponding parts.

The nature of my invention consists, first, in adjusting the shaft of the saw-supporting disk in its bearings forward or backward by means of screw-shafts, gearing, and hand-wheel shaft, or their equivalents, in order to set the saw-supporting disk at the proper distance from the grindstone.

It consists, second, in the combination of a frame which supports the bearings of the disk-shaft with a railway and sliding yokes, for the purpose of allowing the disk to be adjusted in the direction of the shaft as well as in a direction at right angles to it.

It consists, third, in the combination of a sliding bearing of the disk-shaft with a double eccentric upon the disk-shaft and a friction-roller upon an independent shaft, for the purpose of grinding saws of an unequal thickness.

It consists, fourth, in holding the saw to the disk by means of two center-pins and an adjustable friction-roller.

It consists, fifth, in the arrangement and combination of the set-screw, bearing, and shaft of the saw-supporting disk so that the face of said disk may be adjusted parallel to or oblique to the circumference of the grindstone, substantially as hereinafter set forth.

To enable others skilled in the art to make and use my invention, I will proceed to describe its construction and operation.

The saw C is attached to a disk, A, by means of two center-pins, B B, projecting from the disk and fitting the center-hole of the saw. After the disk has been set, in a manner hereinafter to be described, so that the surface of the saw is in contact with the grindstone H, the shank E of the friction-roller D is adjusted in the collar extending from the bracket G, until the roller bears hard against the surface of the saw and keeps the latter steady. The shank and roller are then confined in this position by means of clamp-screw F. The bracket G extends from a frame, U′ U′, which travels in a horizontal railway, K′ K′. This frame consists of two bars, U′ U′, extending across the railway, and bars X′ N′ Y′, extending parallel to the rails, and connecting the two bars U′ U′ together. The other cross-bars, M′ S, rest and slide with their ends upon the bars U′ U′. The shaft I of the saw-supporting disk is held in a bearing, T′, secured to bar Y′ near to the disk A, and in a bearing, P, near the rear end of said shaft. This bearing P rests upon bar X′, and is allowed some horizontal play at right angles to the shaft I. This play is limited by a set-screw, U, at one end, and an india-rubber abutment, T, at the other end. The object of this arrangement will hereinafter be explained.

Motion is transmitted to shaft I by means of bevel-gearing K L, shaft O, and driving-pulley M. The drawing-shaft O is held in bearing W, secured to the main frame of the machine, and in bearing V, secured to and forming one piece with the sliding bearing P.

To allow the shaft O to accommodate itself to the play of the sliding bearing as well as to the motion of the frame U′ U′ upon the rails K′ K′, the outer end of the shaft O is made with a long groove, N, into which fits a key of the driving-pulley M, so that the shaft can freely slide backward and forward through the driving-pulley.

To allow the shaft I to slide through its bearings in the direction of its axis, so as to admit of the above described adjustment of the disk A and saw C in relation to the grindstone, the bevel-wheel K is keyed to long groove Q in the rear portion of the shaft I, similar to the way in which pulley M is attached to shaft O. The rear end of shaft I abuts against a set-screw, J, screwed through the sliding cross-bar M′, and a collar, R, of shaft I bears against the rear face of the sliding cross-bar S. The hole in the cross-bar S, through which the shaft I passes, is of somewhat larger a diameter than the shaft, so as not to hinder its lateral adjustment by means of sliding bearing P and double eccentric X, hereinafter to be described. Long shafts L L′ pass through holes near the outer ends of cross-bar N′, the collars of the shafts bearing against the front face of the said cross-bar. The rear ends of the shaft are screw-threaded, and work through screw-holes in the outer ends of sliding cross-bar M′. A pair of shorter shafts, S′ S′, have also their bearing in cross-bar N′, and are provided with collars Z′ at both sides of this cross-bar. Their screw-threaded rear ends work through screw-holes in the sliding cross-bar S. Bevel-wheels O′ O′ Q′ Q′ are secured to the front ends of the shafts L′ L′ S′ S′. Another horizontal shaft, V′, at right angles to the said shafts, is provided with bevel-wheels P′ P′ R′ R′, and with a hand-wheel, W′, at one end. On shifting shaft V′ to one or the other side either the bevel-wheels P O′ or the bevel-wheels R Q′ can be brought into gear, and thus, by turning the hand-wheel W′, rotary motion can be imparted either to the shafts L L′ or to the shafts S S′. On rotating the shafts L L′ in the proper direction their screw-threaded ends will work through the screw-holes in the cross-bar M′, and thus move the said cross-bar forward. The set-screw J, bearing against the rear end of shaft I, will thus be made to move the shaft I and disk A and saw C forward, so as to effect the above-described adjustment of the saw in relation to the grindstone. The extent of this forward motion will determine the thickness to which the saw should be reduced by the action of the grindstone, and will be limited by the cross-bar S. As soon as the collar R of shaft I comes to bear against the rear face of cross-bar S, the shaft I cannot be moved farther forward.

It will be understood that by shifting the shaft V′ so as to bring the bevel-wheels R Q′ into gear, and operating the shafts S S′, the cross-bar S can be set at any desired distance from collar R, and when the grinding operation has been gone through the cross-bar M′ can be moved back by operating the screw-shafts L′ L′, and then the cross-bar S can be moved back by operating the screw-shafts S′ S′ so as to move back the shaft I, disk, and saw until the end of shaft I again bears against set-screw J. The saw can then be removed and another one inserted.

When saws are of unequal thickness, it is desirable that the thicker part of the saw should be pressed harder against the grindstone than the rest of the surface of the saw, in order to reduce it soon to uniform thickness. To effect this purpose an eccentric, Y, is fastened to shaft I, near the sliding bearing P. A disk, X, with an eccentric hole, of diameter equal to the diameter of the eccentric Y, is made to fit said eccentric, as seen in Figs. 2, 3, and 4. It will be seen that when the center of the hole of X coincides with the center of Y, the disk X will be concentric with the shaft I; but when the disk X is moved on the eccentric Y so that said centers no longer coincide the disk itself will be eccentric in relation to the shaft I, and this eccentricity can be enlarged by moving the disk toward that position wherein the centers of the disk-hole and of the eccentric Y are at opposite sides of the center of shaft I. The disk can be secured in any desirable position in regard to eccentric Y, and consequently at any desirable eccentricity in regard to shaft I, as above described, by means of a set-screw, A′, working through the disk X and bearing against the surface of eccentric Y. The disk X bears against a friction-roller, C, turning on an independent pivot which projects from a bracket secured to frame U′. When the disk X, bearing against friction-roller Z, is set eccentrically, as above set forth, it will, during each revolution, move this end of shaft I to one side a distance corresponding to the amount of eccentricity of the disk. The center of this motion of the rear portion of shaft I is the bearing T′, and the india-rubber abutment T allows the bearing P to yield, together with the shaft, in this direction, and at the same time serves to return the bearing and shaft I to their original position once during each revolution of disk X. Such a motion of the shaft I will cause a portion of the disk A and saw C to approach toward and bear hard against the grindstone once during each revolution, and it will only be necessary to set the thickest part of the saw in line with the greatest eccentricity of the eccentric position of disk X to submit the said thickest part of the saw to the increased action of the grindstone. The amount of eccentricity of the disk X is to be adjusted according to the greatest difference in the thickness of the saw.

A shaft, C′, extending parallel to the rails K′ K′, has its bearings in blocks secured to the main frame. A clutch sliding upon a key on said shaft can be moved to one or the other side by means of a lever, G′, pivoted at I′, connecting-rod H′, and hand-lever J′, so as to connect with either of two driving-pulleys, E′ E′, turning loosely upon the shaft C′ and driven by belts in opposite directions.

On connecting the clutch with either of the pulleys the shaft will be made to revolve in either direction, and the screw-threaded end of the shaft, working through a screw-hole in one of the frame-bars U′ at D′, will feed the whole frame U′ U′ forward or backward upon the rails K K′, so as gradually to present the whole surface of the saw to the action of the grindstone.

What I claim as my invention, and desire to secure by Letters Patent, is—

1. So arranging the saw-supporting disk-shaft I, the feed-carriage, and [the gearing that said shaft is moved laterally independently of the carriage, and simultaneously therewith the shaft and carriage moved together longitudinally, substantially as and for the purposes set forth.

2. The combination of the gage-stop R and its adjusting-screws with the sliding shaft I and the mechanism by which it is controlled and actuated, substantially as and for the purposes set forth.

3. The combination of a sliding bearing of the disk-shaft with a double eccentric upon the disk-shaft and a friction-roller upon an independent shaft, substantially as and for the purposes set forth.

4. Holding the saw to the disk by means of two center-pins and an adjustable friction-roller, substantially as and for the purposes set forth.

5. The arrangement and combination of the set-screw U, bearing P, and shaft I of the saw-supporting disk so that the face of said disk may be adjusted parallel to or oblique to the circumference of the grindstone, substantially as and for the purposes set forth.

The above specification of my improvement in saw-grinding machines signed by me this 17th day of September, 1860.

H. R. BURGER.

Witnesses:

FRED. T. ANDREW,
G. W. TOPHAM.